US012277670B2

(12) United States Patent
Noh et al.

(10) Patent No.: US 12,277,670 B2
(45) Date of Patent: Apr. 15, 2025

(54) IMAGE PROCESSING METHOD AND APPARATUS (71) Applicant: KOREA ADVANCED INSTITUTE OF SCIENCE AND TECHNOLOGY, Daejeon (KR)

(72) Inventors: Junyong Noh, Daejeon (KR); Sanghun Park, Daejeon (KR); Kwanggyoon Seo, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 18/457,499

(22) Filed: Aug. 29, 2023

(65) Prior Publication Data
US 2023/0410249 A1    Dec. 21, 2023

Related U.S. Application Data (62) Division of application No. 17/444,919, filed on Aug. 12, 2021, now Pat. No. 11,790,486.

(30) Foreign Application Priority Data

Nov. 24, 2020    (KR) .................. 10-2020-0159197

(51) Int. Cl.
*G06K 9/00*    (2022.01)
*G06N 3/045*    (2023.01)
*G06N 3/088*    (2023.01)
*G06T 3/4007*    (2024.01)
(Continued)

(52) U.S. Cl.
CPC ........... *G06T 3/4007* (2013.01); *G06N 3/045* (2023.01); *G06N 3/088* (2013.01); *G06T 3/4046* (2013.01); *G06T 5/50* (2013.01); *G06T 2207/20081* (2013.01); *G06T 2207/20084* (2013.01)

(58) Field of Classification Search
CPC ....... G06T 3/4007; G06T 3/4046; G06T 5/50; G06T 2207/20081; G06T 2207/20084; G06T 2207/20221; G06T 5/005; G06T 11/00; G06T 3/0093; G06N 3/045; G06N 3/088; G06N 3/08; G06Q 50/22; G06Q 30/0621; G06Q 30/0631; G06Q 50/04; G16H 10/60; G16H 20/70; G16H 30/20; G16H 50/70
See application file for complete search history.

(56) References Cited

U.S. PATENT DOCUMENTS 11,544,880 B2 *    1/2023    Park .................... G06T 9/002

FOREIGN PATENT DOCUMENTS

WO    WO-2020140421 A1 *    7/2020    ............. G06F 17/16

* cited by examiner

*Primary Examiner* — Xin Jia
(74) *Attorney, Agent, or Firm* — BOND, SCHOENECK & KING, PLLC; George R. McGuire (57) ABSTRACT Disclosed is an image processing method and apparatus. The image processing method includes extracting a content latent code and a style latent code for each of a plurality of input images, obtaining a content feature vector by calculating a weighted sum of content latent codes extracted from the input images based on a morphing control parameter, obtaining a style feature vector by calculating a weighted sum of style latent codes extracted from the input images based on the morphing control parameter, and generating a morphing image based on the content feature vector and the style feature vector.

11 Claims, 9 Drawing Sheets

(51) Int. Cl.
*G06T 3/4046* (2024.01)
*G06T 5/50* (2006.01)

IMAGE PROCESSING METHOD AND APPARATUS

CROSS-REFERENCE TO RELATED APPLICATION(S)

This application is a divisional application of U.S. application Ser. No. 17/444,919, filed Aug. 12, 2021, now allowed, which claims the benefit of Korean Patent Application No. 10-2020-0159197, filed on Nov. 24, 2020, in the Korean Intellectual Property Office, the disclosures of each of which is incorporated herein by reference.

BACKGROUND

1. Field of the Invention

One or more example embodiments relate to an image processing method and apparatus, and more particularly, to an image morphing method and apparatus.

2. Description of the Related Art

Image morphing refers to a technology for generating an image sequence in transition between two different images. It is used as a tool for visual effects in movies, television commercials, music videos, and games, due to various transition effects that generate an image from a single digital image.

A typical method of image morphing may include the following three steps: establishing a corresponding relationship between two input images, applying a warping function that changes a shape of an object in the images, and blending the images for a gradual and smooth appearance transition to generate a smooth transition between a given pair of images.

However, such a typical image morphing method may require manual setting of a corresponding relationship between two images for a smooth transition between the images. The method may not apply the warping function when a part of an object that is visible in one image is occluded in another image, and a pair of input images may thus need to have a perceptually similar semantic structure in terms of object pose and camera view.

SUMMARY

An aspect provides an image morphing method with less constraint on object pose and camera view by using a neural network that learns a semantic change of input images.

Another aspect also provides an image morphing method that may not require manual setting of a corresponding relationship between input images.

According to an example embodiment, there is provided an image processing method including, for each of a plurality of input images, extracting a content latent code of an input image based on a content encoder configured to extract a feature of a content of an image, extracting a style latent code of the input image based on a style encoder configured to extract a feature of a style of an image, obtaining a content feature vector by calculating a weighted sum of content latent codes extracted from the input images based on a morphing control parameter, obtaining a style feature vector by calculating a weighted sum of style latent codes extracted from the input images based on the morphing control parameter, and generating a morphing image based on the content feature vector, the style feature vector, and a decoder configured to generate an image from an embedding vector.

The morphing control parameter may include a content morphing control parameter and a style morphing control parameter.

The obtaining of the content feature vector may include obtaining the content feature vector by calculating a weighted sum of content latent codes extracted from the input images based on the content morphing control parameter.

The obtaining of the style feature vector may include obtaining the style feature vector by calculating a weighted sum of style latent codes extracted from the input images based on the style morphing control parameter.

The input images may include a first image and a second image.

The obtaining of the content feature vector may include interpolating a first content latent code extracted from the first image and a second latent content code extracted from the second image based on the content morphing control parameter.

The obtaining of the style feature vector may include interpolating a first style latent code extracted from the first image and a second latent style code extracted from the second image based on the style morphing control parameter.

The morphing control parameter may include weights corresponding to the input images.

The generating of the morphing image may include obtaining a processed style feature vector by applying the style feature vector to a mapping network, and generating the morphing image by decoding the processed style feature vector and the content feature vector based on the decoder.

The content of an image may include information associated with a pose of an object in the image, a position of the object in the image, and a composition of a camera capturing the image of the object.

The style of an image may include information associated with an appearance of an object in the image.

The input images may be different in at least one of the content or the style.

The morphing image may include a combination of one or more content features among content features of the input images and a combination of one or more style features among style features of the input images.

The input images may include a plurality of frames of a video, and the morphing image may include an intermediate frame of the frames of the video.

According to another example embodiment, there is provided a training method including obtaining training data including a first image, a second image, and a ground truth morphing image that is based on a morphing control parameter, obtaining an output morphing image by inputting the first image, the second image, and the morphing control parameter to a morphing generator, and training the morphing generator based on a loss function that is based on at least one of the images included in the training data and the output morphing image. The loss function may be determined based on at least one of an adversarial loss associated with a discrimination between the image included in the training data and the output morphing image obtained from the morphing generator, or a pixel-wise reconstruction loss associated with a difference between pixels of the image included in the training data and pixels of the output morphing image.

The adversarial loss may include a conditional adversarial loss in which class label information of one of the images included in the training data is set as a condition.

The adversarial loss may be determined based on the morphing control parameter, an adversarial loss associated with a discrimination between the first image and the output morphing image, and an adversarial loss associated with a discrimination between the second image and the output morphing image.

The pixel-wise reconstruction loss may be determined based on the ground truth morphing image corresponding to the morphing control parameter among the images included in the training data and on the output morphing image.

The morphing control parameter may include a content morphing control parameter and a style morphing control parameter.

The obtaining of the output morphing image may include obtaining a first output morphing image including a content of the second image and a style of the first image, and obtaining a second output morphing image including a content of the first image and a style of the second image.

The training of the morphing generator may include training the morphing generator based on an adversarial loss associated with a discrimination between the first output morphing image and the first image, and an adversarial loss associated with a discrimination between the second output morphing image and the second image.

The training of the morphing generator may include obtaining a third morphing image including a content of the second output morphing image and the style of the second image by inputting the second output morphing image and the second image to the morphing generator, obtaining a fourth morphing image including a content of the first output morphing image and the style of the first image by inputting the first output morphing image and the first image to the morphing generator, training the morphing generator based on an adversarial loss and a pixel-wise reconstruction loss that are based on the third output morphing image and the second image, and training the morphing generator based on an adversarial loss and a pixel-wise reconstruction loss that are based on the fourth output morphing image and the first image.

According to still another example embodiment, there is provided an image processing apparatus including at least one processor. For each of a plurality of input images, the processor may extract a content latent code by encoding an input image, extract a style latent code by encoding the input image, obtain a content feature vector by calculating a weighted sum of content latent codes extracted from the input images based on a morphing control parameter, obtain a style feature vector by calculating a weighted sum of style latent codes extracted from the input images based on the morphing control parameter, and generate a morphing image based on the content feature vector and the style feature vector.

The morphing control parameter may include a content morphing control parameter and a style morphing control parameter.

For the obtaining of the content feature vector, the processor may obtain the content feature vector by calculating a weighted sum of content latent codes extracted from the input images based on the content morphing control parameter. For the obtaining of the style feature vector, the processor may obtain the style feature vector by calculating a weighted sum of style latent codes extracted from the input images based on the style morphing control parameter.

The input images may include a first image and a second image.

For the obtaining of the content feature vector, the processor may interpolate a first content latent code extracted from the first image and a second content latent code extracted from the second image based on the content morphing control parameter. For the obtaining of the style feature vector, the processor may interpolate a first style latent code extracted from the first image and a second style latent code extracted from the second image based on the style morphing control parameter.

For the generating of the morphing image, the processor may obtain a processed style feature by applying the style feature vector to a mapping network, and generate the morphing image by decoding the processed style feature vector and the content feature vector.

The morphing control parameter may include weights corresponding to the input images.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

The following structural or functional descriptions are exemplary to merely describe example embodiments, and the scope of the example embodiments is not limited to the descriptions provided in the present specification. Various changes and modifications can be made to the example embodiments by one skilled in the art.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component.

As used herein, the singular forms "a," "an," and "the," are intended to include the plural forms as well, unless the context clearly indicates otherwise. It will be further understood. that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Unless otherwise defined, all terms, including technical and scientific terms, used herein have the same meaning as commonly understood by one skilled in the art to which the example embodiments pertain. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments are described in detail with reference to the accompanying drawings. The same reference numerals in each drawing indicate the same members. Regarding the reference numerals assigned to the components in the drawings, it should be noted that the same components will be designated by the same reference numerals, wherever possible, even though they are shown in different drawings, and duplicated description thereof will be omitted.

Morphing Dataset Preparation

Figure 1:
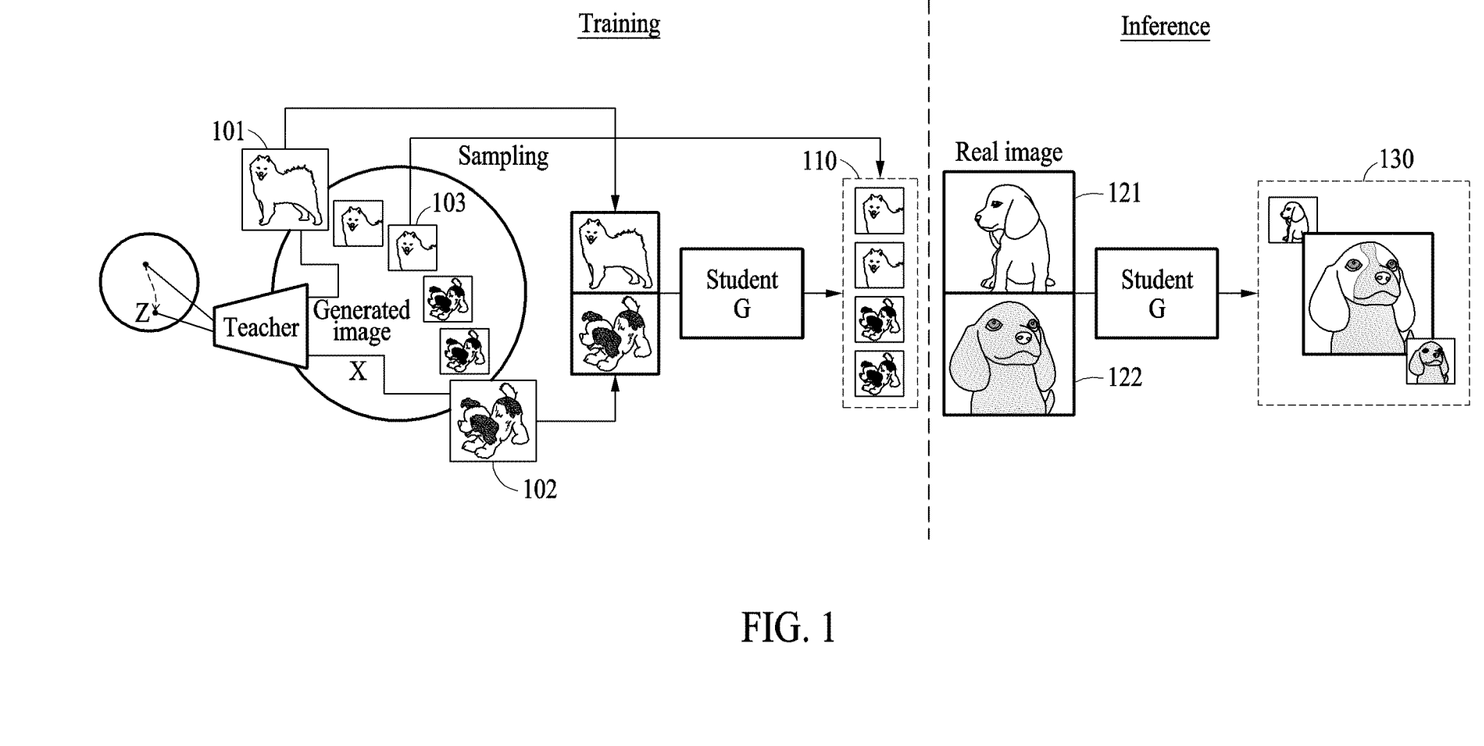
FIG. 1 is a diagram illustrating a neural network for image morphing according to an example embodiment.

FIG. 1 is a diagram illustrating a neural network for image morphing according to an example embodiment.

According to an example embodiment, a neural network for image morphing may be a feed-forward neural network that learns a semantic change between input images in a latent space, which may correspond to a network that outputs a morphing image from an input image to another input image. The neural network may also be referred to herein as a morphing generator, a generator, or G.

Referring to FIG. 1, a morphing dataset may be constructed to extract or distill an ability for a semantic change from a pre-trained teacher generative model to a student generator G.

As the teacher generative model for constructing the morphing dataset, a big generative adversarial network (BigGAN) which is known to work well for a class-conditional image synthesis may be used. BigGAN may generate a desired class image using a class embedding vector as an input, in addition to noise vectors sampled at two points. This new image may be generated by a linear interpolation of two noise vectors zA and zB and two class embedding vectors eA and eB based on a control parameter α. The interpolation may generate a smooth semantic change from one class of image to another.

Through sampling at two points, a pair of images 101 and 102 different in terms of an appearance and a pose of an object, and a camera view may be generated. This may enable an effective simulation of a sufficient supply of a pair of images selected by a user under weak constraints on the object pose. As a result, a class label ($\{1A, 1B\} \in L$) and a training data triplet $\{xA, xB, x\alpha\}$ may be obtained for the generator to learn a morphing function. The training data triplet may be obtained as expressed in Equation 1 below.

$$x_A = \text{BigGAN}(z_A, e_A), x_B = \text{BigGAN}(z_B, e_B),$$

$$x_\alpha = \text{BigGAN}((1-\alpha)z_A + \alpha z_B, (1-\alpha)e_A + \alpha e_B)) \quad \text{[Equation 1]}$$

In Equation 1, α may be sampled from a uniform distribution U[0,1].

Neural Based Image Morphing
Basic Transition

In a training phase, the morphing generator (G: $\{x_A, x_B, x_\alpha\} \rightarrow y_\alpha$) may be trained to generate a sequence 110 of morphing images ($y_\alpha \in Y$) that smoothly change from a given pair of images ($\{x_A, x_B\} \in X(\mathbf{101}, \mathbf{102})$). Here, $\alpha\{\alpha \in R: 0 \leq \alpha \leq 1\}$ may refer to a morphing control parameter. In the training phase, the morphing generator may learn how to morph an image in a latent space of the teacher generative model. The pair $\{x_A, x_B\}$ of the input images 101 and 102 may be sampled at two points in the latent space, and a target intermediate image $x_\alpha$ 103 may be generated by linearly interpolating the two sampled points with a morphing control parameter α.

The morphing generator G may learn mapping from a sampled input space $\{x_A, x_B, \alpha\}$ of the teacher generative model to the target morphing image $x_\alpha$ by an adversarial training discriminator D. The discriminator D may be used to distinguish between a data distribution ($x \in X$) and a generator distribution ($y \in Y$). The discriminator D may be a multitask discriminator that generates an output |L| for a multiple adversarial classification task. In other words, an output of the discriminator D may include a real or fake score of an input image in each class. The real or fake score may be determined based on a probability that the input image is a real image ($x \in X$) included in training data and/or a fake image ($y \in Y$) outputted from the morphing generator. According to an example embodiment, only an l-th output branch of the discriminator D may be penalized depending on the class label ($\{1_A, 1_B\} \in L$) related to the input images $\{x_A, x_B\}$. Through adversarial training, the discriminator D may force the generator G to extract a content and a style of an input image and smoothly change or translate one image into another image. A training method of the generator G will be described hereinafter.

When training is completed, the generator G may be ready to generate a morphing image ($x_\alpha \approx y_\alpha = G(x_A, x_B, \alpha)$) in which a semantic change of the teacher generative model is reflected therein. In an inference phase, a user may input a plurality of images, for example, an image 121 and an image 122, to the trained generator G. By controlling a morphing control parameter α, the user may obtain a morphing image 130 generated by a smooth transition between the images 121 and 122.

Disentangled Content and Style Transition

According to an example embodiment, the morphing generator that makes a smooth transition from a content and style of an image $x_A$ to those of an image $x_B$ may be expanded to separately perform a content transition and a style transition. The content used herein may refer to a pose, a camera view, and a position of an object in an image. The style used herein may refer to an appearance that identifies a class or domain of an object in an image.

To indicate such content and style, images $x_A$, $x_B$, and $x_\alpha$ that are included in a training data triplet may be indicated as $x_{AA}$, $x_{BB}$, and $x_{\alpha\alpha}$, respectively. A first subscript may correspond to an identifier of the content, and a second subscript may correspond to an identifier of the style.

Figure 2:
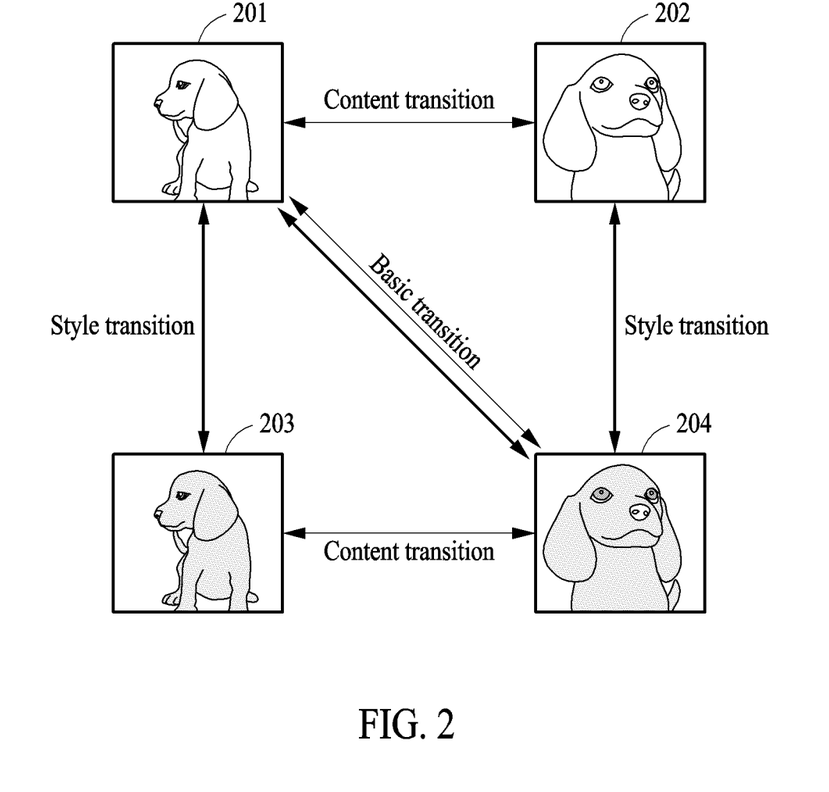
FIG. 2 is a diagram illustrating a disentangled content and style transition according to an example embodiment.

Referring to FIG. 2, illustrated are an image 201, an image 203 in which a content of the image 201 is maintained with a style thereof being changed to a style of an image 204, an image 202 in which the style of the image 201 is maintained with the content thereof being changed to a content of the image 204, and the image 204. When comparing the image 201 and the image 203 with the changed style, it may be verified that they are the same in an object pose and an image composition, but an appearance of an object is changed to an appearance of an object included in the image 204. When comparing the image 201 and the image 202 with the changed content, it may be verified that they are the same in an appearance of an object included in each of the images 201 and 202, but an object pose and an image composition are changed to those shown in the image 204. For example, when the image 201 is indicated as $x_{AA}$ and the image 204 is indicated as $x_{BB}$, the image 203 including the content of the image 201 and the style of the image 204 may be indicated as $x_{AB}$, and the image 202 including the content of the image 204 and the style of the image 201 may be indicated as $x_{BA}$.

Figure 3A:
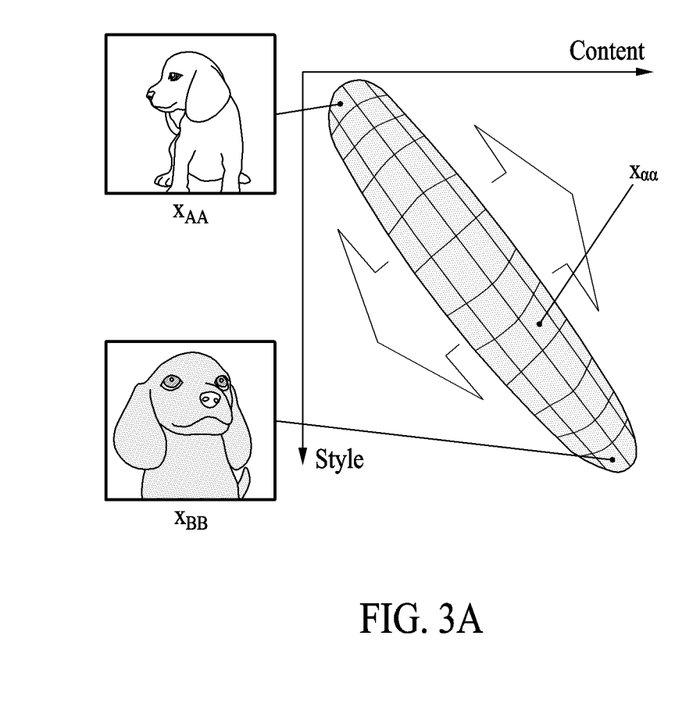
FIGS. 3A and 3B are diagrams illustrating a two-dimensional (2D) transition manifold that spans a plane defined by a content-style axis according to an example embodiment.
Figure 3B:
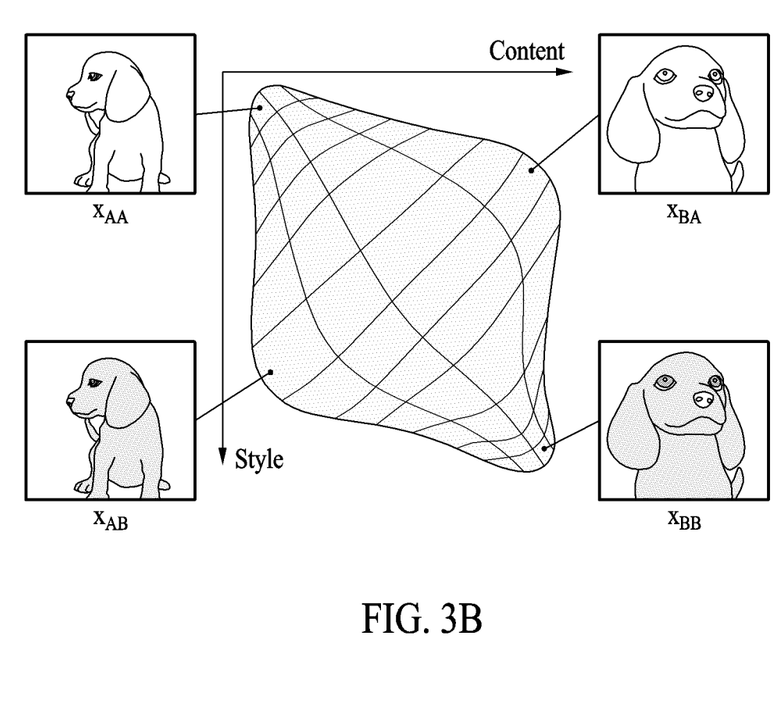

As illustrated in FIGS. 3A and 3B, a disentangled transition may increase a dimension of morphing control, for example, from a one-dimensional (1D) transition manifold between input images to a two-dimensional (2D) transition manifold that spans a plane defined by a content-style axis. Such an expansion may be achieved by training the morphing generator to generate images $x_{AB}$ and $x_{BA}$ by changing or swapping a style and content between two images $x_{AA}$ and $x_{BB}$.

The morphing generator that is trained with the disentangled transition may generate a series of an image sequence corresponding to a transition process from $x_{AA}$ to $x_{BB}$, and may also generate a series of an image sequence corresponding to a transition process from $x_{AA}$ to $x_{AB}$, a transition process from $x_{AA}$ to $x_{BA}$, a transition process from $x_{BA}$ to $x_{BB}$, and a transition process from $x_{AB}$ to $x_{BB}$ based on a content morphing control parameter and a style morphing control parameter. That is, the morphing generator may generate a morphing image that includes a combination of one or more content features of a plurality of input images and a combination of one or more style features of the input images.

However, the training data triplet $\{x_A, x_B, x_{\alpha\alpha}\}$, which is a training dataset for a basic transition, may not include an image with swapped content and style. While the basic transition may be learned by a combination of supervised learning and self-supervised learning, the disentangled transition may be learned only by unsupervised learning.

According to an example embodiment, the morphing generator G that performs such a disentangled content and style transition may be expressed as in Equation 2 below.

$$y_{\alpha_c \alpha_s} = G(x_{AA}, x_{BB}, \alpha_C, \alpha_S)$$

$$\alpha_C, \alpha_S \in \mathbb{R} : 0 \leq \alpha_C, \alpha_S \leq 1, \quad \text{[Equation 2]}$$

In Equation 2, $\alpha_c$ and $\alpha_s$ denote a content morphing control parameter and a style morphing control parameter, respectively. In the inference phase, by separately controlling $\alpha_c$ and $\alpha_s$, a user may smoothly change a content with a style of an output image fixed, and also smoothly change the style with the content fixed.

Equation 2 may be further factorized as in Equation 3 below.

$$y_{\alpha_c \alpha_s} = G(x_{AA}, x_{BB}, \alpha_C, \alpha_S)$$

$$= F(c_{\alpha_c}, s_{\alpha_s}) \quad \text{[Equation 3]}$$

In Equation 3, c ac may be expressed as in Equation 4 below.

$$c_{\alpha_c} = \text{Lerp}(c_A, c_B, \alpha C), s_{\alpha_s} = \text{Lerp}(s_A, s_B, \alpha_S),$$

$$c_A = E_c(x_{AA}), c_B = E_c(x_{BB}),$$

$$s_A = E_s(x_{AA}), s_B = E_s(x_{BB}), \quad \text{[Equation 4]}$$

In Equation 4, Lerp(A, B, α) denotes a linear function of $(1-\alpha)A+\alpha B$ and may interpolate a latent code extracted from each of two encoders before feeding the latent code to a decoder F. By interpolating content and the style features at a deep bottleneck position of a network layer, the morphing generator G may learn mapping that generates a morphing image at the same manifold defined in two input images.

Figure 4:
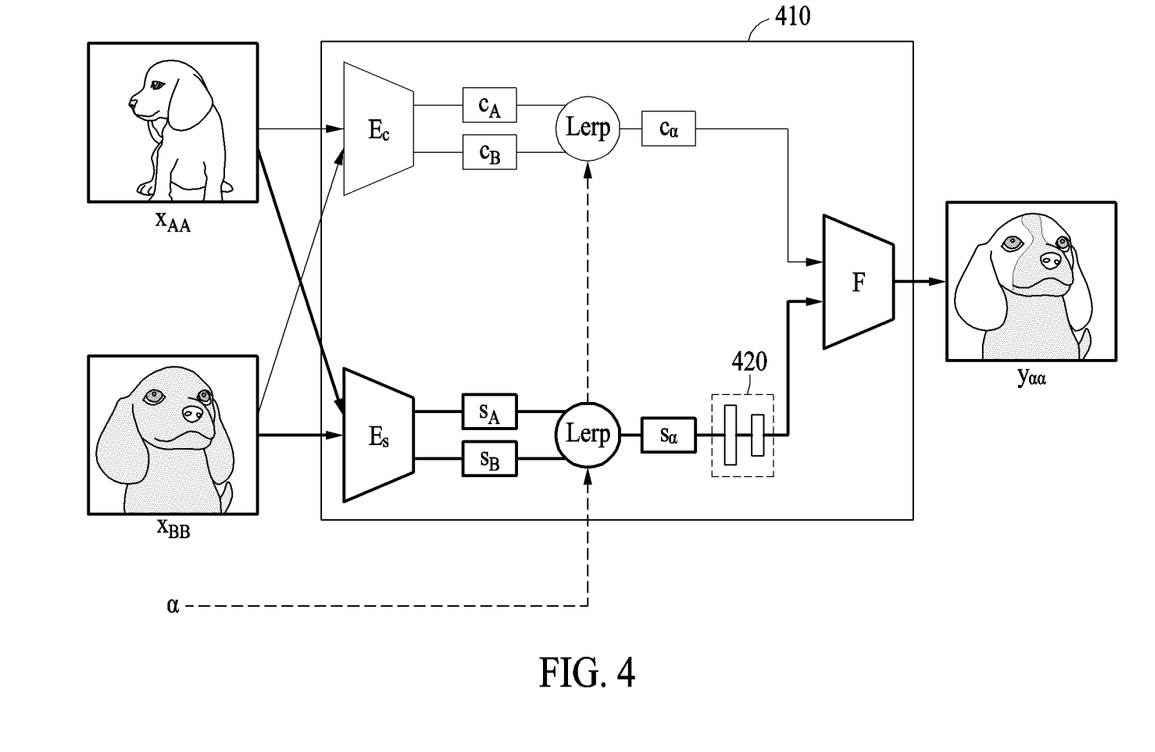
FIG. 4 is a diagram illustrating a structure of a morphing generator configured to perform a basic transition according to an example embodiment.

FIG. 4 is a diagram illustrating a structure of a morphing generator configured to perform a basic transition according to an example embodiment.

Referring to FIG. 4, a morphing generator 410 may include autoencoders $E_c$ and $E_s$ that may learn a content space and a style space, respectively, and a component lerp that adjusts a latent code based on a morphing control parameter α for image morphing. The morphing generator 410 which is a student network may learn a basic morphing effect of a teacher network by adjusting the latent code. The morphing generator 410 may also learn disentangled morphing that the teacher network may not generate by individually adjusting latent codes in separate content and style spaces.

For example, in a case in which input images $\{x_{AA}, x_{BB}\}$ is given, the morphing generator 410 may be implemented as a convolutional neural network (CNN) that outputs a morphing image $y_{\alpha\alpha}$. The morphing generator 410 may include the autoencoders Ec and Es (e.g., content encoder Ec and style encoder Es) and a decoder F. Ec may extract a content latent code c=(x) from an input image x, and Es may extract a style latent code $s=E_s(x)$ from the input image x. Since a weight of each encoder is shared by different classes, an input image may be mapped in a shared latent space for contents and styles of all classes.

For example, the content encoder Ec may include three downsampling layers and three bottleneck layers, and the style encoder Es may include six downsampling layers and a final global sum pooling layer. Each of the content latent code c and the style latent code s may be interpolated to a latent tensor and a latent vector, respectively.

The style latent code s may be input to a mapping network 420 before being input to the decoder F. The mapping network 420 may include a multilayer perceptron (MLP) layer and an adaptive instance normalization (AdaIN) layer. The decoder F may decode the style latent code s and the content latent code c that have passed through the mapping network 420 into an output image y. The components of the morphing generator 410, for example, Ec, Es, F, and MLP, may learn mapping between different classes using a single network.

According to an example embodiment, an image processing method performed by the morphing generator 410 may include extracting content latent codes $c_A$ and $c_B$ and style latent codes $s_A$ and $s_B$ from each of a plurality of input images $x_{AA}$ and $x_{BB}$, obtaining a content feature vector $c_\alpha$ by calculating a weighted sum of the content latent codes $c_A$ and $c_B$ extracted from the input images based on a morphing control parameter α, obtaining a style feature vector $s_\alpha$ by calculating a weighted sum of the style latent codes $s_A$ and $s_B$ extracted from the input images based on the morphing control parameter α, and generating a morphing image $y_{\alpha\alpha}$ based on the content feature vector $c_\alpha$ and the style feature vector $s_\alpha$.

The extracting of the content latent codes $c_A$ and $c_B$ and the style latent codes $s_A$ and $s_B$ from each of the input images may include extracting a content latent code of a corresponding input image based on the content encoder $E_c$ that extracts a content feature of the input image, and extracting a style latent code of the input image based on the style encoder $E_s$ that extracts a style feature of the input image.

For example, the extracting of the content latent code and the style latent code may include extracting the content latent code $c_A$ from the input image $x_{AA}$ by applying the input image $x_{AA}$ to the content encoder $E_c$, extracting the style latent code $s_A$ from the input image $x_{AA}$ by applying the input image $x_{AA}$ to the style encoder $E_s$, extracting the content latent code $c_B$ from the input image $x_{BB}$ by applying the input image $x_{BB}$ to the content encoder $E_c$, and extracting the style latent code s B from the input image $x_{BB}$ by applying the input image $x_{BB}$ to the style encoder $E_s$.

The obtaining of the content feature vector $c_\alpha$ may include interpolating or calculating a weighted sum of the content latent codes $c_A$ and $c_B$ that are output in response to the input images based on $c_\alpha$=Lerp $(c_A, c_B, \alpha)$=$(1-a)c_A+\alpha c_B$. Likewise, the obtaining of the style feature vector $s_\alpha$ may include interpolating or calculating a weighted sum of the style latent codes $s_A$ and $s_B$ that are output in response to the input images based on $s_\alpha$=Lerp $(s_A, s_B, \alpha)$=$(1-\alpha)s_A+\alpha s_B$.

The generating of the morphing image y aa may include generating the morphing image $y_{\alpha\alpha}$ by decoding the style feature vector $s_\alpha$ and the content feature vector $c_\alpha$ based on the decoder F that generates an image from a feature vector. The style feature vector $s_\alpha$ may be processed after having passed through the mapping network 420, and the decoder F may output the morphing image y aa based on the processed style feature vector and the content feature vector.

Although the morphing generator 410 is illustrated in FIG. 4 as receiving two images and generating a morphing image based on a morphing control parameter, the morphing generator 410 may also receive two or more images and generate a morphing image thereby based on a morphing control parameter.

Figure 5:
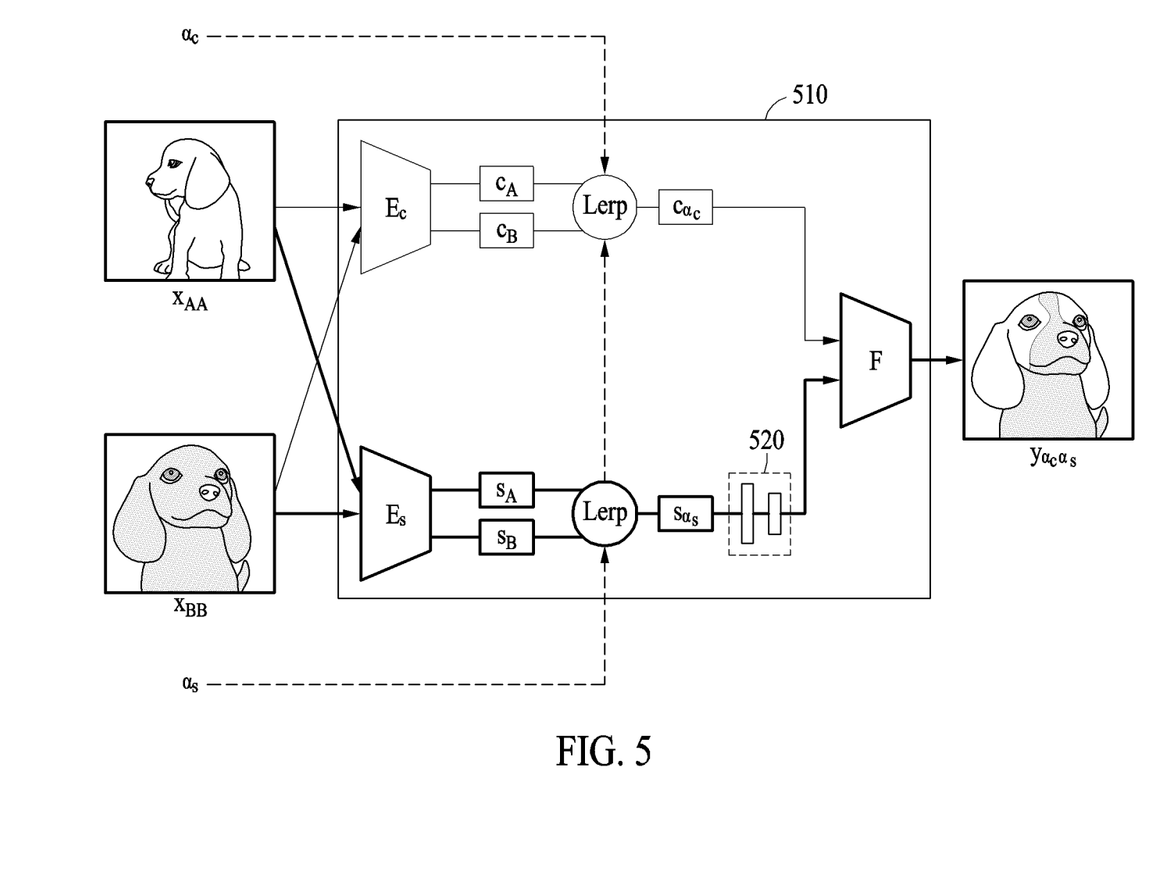
FIG. 5 is a diagram illustrating a structure of a morphing generator configured to perform a disentangled content and style transition according to an example embodiment.

FIG. 5 is a diagram illustrating a structure of a morphing generator configured to a disentangled content and style transition according to an example embodiment.

Referring to FIG. 5, a morphing control parameter may include a content morphing control parameter $\alpha_c$ and a style morphing control parameter $\alpha_s$. According to an example embodiment, a morphing generator 510 may individually control latent codes based on the content morphing control parameter $\alpha_c$ and the style morphing control parameter $\alpha_s$ in separate content and style spaces.

For example, in a case in which input images are $x_{AA}$ and $x_{BB}$, obtaining a content feature vector $c_{\alpha_c}$ may include obtaining the content feature vector $c_{\alpha_c}$ by calculating a weighted sum of content latent codes $c_A$ and $c_B$ extracted from each of the input images $x_{AA}$ and $x_{BB}$ based on the content morphing control parameter $\alpha_c$, and obtaining a style feature vector $s_{\alpha_s}$ may include obtaining the style feature vector $s_{\alpha_s}$ by calculating a weighted sum of style latent codes $s_A$ and s B extracted from each of the input images based on the style morphing control parameter $\alpha_s$.

The content feature vector $c_{\alpha_c}$ may be obtained by interpolating or calculating a weighted sum of content latent codes output in response to input images based on Lerp($c_A$, $c_B$, $\alpha_C$). The style feature vector $s_{\alpha_s}$ may be obtained by interpolating or calculating a weighted sum of style latent codes output in response to the input images based on Lerp($s_A$, $s_B$, $\alpha_C$).

The decoder F may output a morphing image $y_{\alpha_c\alpha_s}$ based on the content feature vector and the style feature vector. As described above, the style feature vector may be input to the decoder F after being processed by a mapping network 520.

Training Objectives

Figure 6:
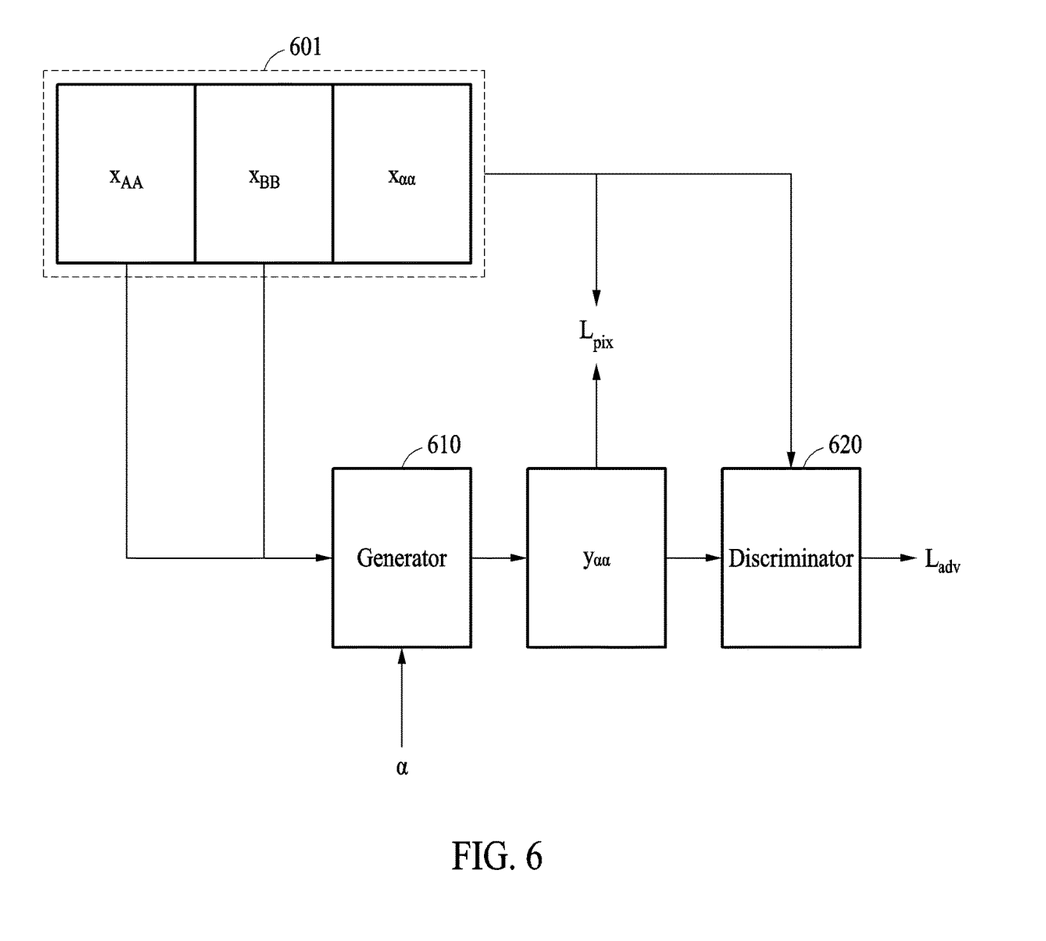
FIGS. 6 and 7 are diagrams illustrating a training method of a morphing generator according to an example embodiment.

FIG. 6 is a diagram illustrating a training method of a morphing generator according to an example embodiment.

Referring to FIG. 6, a training method of a morphing generator 610 may include obtaining training data 601 including a first image $x_{AA}$, a second image $x_{BB}$, and a ground truth morphing image $x_{\alpha\alpha}$ that is based on a morphing control parameter α, obtaining an output morphing image $y_{\alpha\alpha}$ by inputting the first image $x_{AA}$, the second image $x_{BB}$, and the morphing control parameter α to the morphing generator, and training the morphing generator 610 based on a loss function based on at least one of the images $x_{AA}$, $x_{BB}$, and $x_{\alpha\alpha}$ included in the training data 601 and the output morphing image $y_{\alpha\alpha}$. The training data 601 may correspond to a training data triplet $\{x_{AA}, x_{BB}, x_{\alpha\alpha}\}$ described above.

Loss Function

According to an example embodiment, the morphing generator 610 may be trained using two main loss functions. The first loss function may correspond to an adversarial loss $L_{adv}$. The adversarial loss $L_{adv}$ may refer to an adversarial loss associated with a discriminating between an image included in the training data 601 and an image obtained by the morphing generator 610, and be used for adversarial training of the morphing generator 610 and a discriminator 620 configured to discriminate the image included in the training data 601 and the image generated by the morphing generator 610. The adversarial loss $L_{adv}$ may include a conditional adversarial loss with class label information of the image included in the training data 601 being set as a condition. For example, in response to a given class label ($l \in L$), the discriminator 620 may distinguish whether an input image is real data ($x \in X$) of a class or data ($y \in Y$) generated by the morphing generator 610. The morphing generator 610 may attempt to deceive the discriminator 620 by generating a similar output image y to a real image x using the conditional adversarial loss function as expressed in Equation 5 below.

$$L_{adv}(x,y,l) = \mathbb{E}_x[\log D(x|l)] + \mathbb{E}_y[\log(1-D(y|l))]. \quad \text{[Equation 5]}$$

The second loss function may correspond to a pixel-wise reconstruction loss $L_{pix}$. The pixel-wise reconstruction loss $L_{pix}$ may be determined based on a difference between a ground truth image and a generated image for each pixel. The ground truth image may be an image included in the training data 601.

For example, when a training data triplet x is given, the morphing generator 610 may be trained to generate an output image y that is similar to a ground truth x based on a pixel-wise Li loss function. For simplicity, the pixel-wise reconstruction loss may be simplified as in Equation 6.

$$\|x-y\|_1 \triangleq \mathbb{E}_{x,y}[\|x-y\|_1]. \quad \text{[Equation 6]}$$

Identity (ID) Loss

Image morphing may refer to a linear transformation between two input images $x_{AA}$ and $x_{BB}$. A morphing generator G may need to transform the two input images and an intermediate image into a representation defined in a deeply unfolded manifold and restore them back into an image domain. The morphing generator G may learn a method of generating the same image as an input in a self-supervised learning manner based on an ID adversarial loss $L^{idt}_{adv}$ and an ID pixel-wise reconstruction loss $L^{idt}_{pix}$ as expressed in Equation 7 below.

$$L_{adv}^{idt} = L_{adv}(x_{AA}, y_{AA}, l_A) + L_{adv}(x_{BB}, y_{BB}, l_B),$$

$$L_{pix}^{idt} = \|x_{AA} - y_{AA}\|_1 + \|x_{BB} - y_{BB}\|_1,$$

where $y_{AA} = F(E_c(x_{AA}), E_s(x_{AA})) = G(x_{AA}, x_{BB}, 0, 0)$, $$y_{BB} = F(E_c(x_{BB}), E_s(x_{BB})) = G(x_{AA}, x_{BB}, 1, 1), \quad \text{[Equation 7]}$$

In Equation 7, images $y_{AA}$ and $y_{BB}$ may be images output by adjusting a parameter $\alpha$ not to morph input images $x_{AA}$ and $x_{BB}$. These images may be a restored version of the input images by the morphing generator G. Such an ID loss may help two encoders $E_c$ and $E_s$ extract latent codes onto a plane manifold from an input image x, and help the decoder F restore these two latent codes back in the form of the input images.

Morphing Loss

A result from morphing two images may need to have features of the two images. To this end, a weighted adversarial loss $L^{mrp}_{adv}$ that applies a weighted style between $x_{AA}$ and $x_{BB}$ to an output image based on a value of a may be used. In addition, when target morphing data $x_{\alpha\alpha}$ is given, the morphing generator G may learn a semantic change between the two images by minimizing a pixel-wise reconstruction loss $L^{mrp}_{pix}$. These two losses may be expressed as in Equation 8 below.

$$L_{adv}^{mrp} = (1-\alpha) L_{adv}(x_{AA}, \mathcal{Y}_{\alpha\alpha}, l_A) + \alpha L_{adv}(x_{BB}, \mathcal{Y}_{\alpha\alpha}, l_B),$$

$$L_{pix}^{mrp} = \|x_{\alpha\alpha} - y_{\alpha\alpha}\|_1,$$

where $\mathcal{Y}_{\alpha\alpha} = F(c_\alpha, s_\alpha) = G(x_{AA}, x_{BB}, \alpha, \alpha),$ [Equation 8]

In Equation 8, $c_\alpha$ and $s_\alpha$ may be interpolated from a latent code extracted using a and Equation 4. Similar to an ID loss, such a morphing loss may force an output image $y_{\alpha\alpha}$ of the generator to be in a line manifold that connects the two input images.

Swapping Loss

The morphing generator G may be trained to output images $y_{AB}$ and $y_{BA}$ in which a content or style is swapped to expand a basic transition to a disentangled transition. However, such images may not be included in training data, and thus a swapping loss $L^{swp}_{adv}$ may need to be minimized through unsupervised learning as expressed in Equation 9 below.

$$L_{adv}^{swp} = L_{adv}(x_{AA}, y_{BA}, l_A) + L_{adv}(x_{BB}, y_{AB}, l_B),$$

where $y_{AB} = F(E_c(x_{AA}), E_s(x_{BB})) = G(x_{AA}, x_{BB}, 0, 1),$ $$y_{BA} = F(E_c(x_{BB}), E_s(x_{AA})) = G(x_{AA}, x_{BB}, 1, 0), \quad \text{[Equation 9]}$$

This loss may allow the two encoders $E_c$ and $E_s$ to separate two features from each of input images in which a content and style are entangled.

Cycle-Swapping Loss

The morphing generator G may use cycle-swapping losses $L^{cyc}_{adv}$ and $L^{cyc}_{pix}$ as expressed in Equation 10 to learn a disentangled representation and ensure that content or style-swapped images preserve a content of an input image.

$$L_{adv}^{cyc} = L_{adv}(x_{AA}, \mathcal{Y}_{AA}', l_A) + L_{adv}(x_{BB}, \mathcal{Y}_{BB}', l_B),$$

$$L_{pix}^{cyc} = \|x_{AA} - \mathcal{Y}_{AA}'\|_1 + \|x_{BB} - \mathcal{Y}_{BB}'\|_1,$$

where $\mathcal{Y}_{AA}' = F(E_c(\mathcal{Y}_{AB}), E_s(x_{AA})) = G(\mathcal{Y}_{AB}, x_{AA}, 0, 1)$ $\mathcal{Y}_{BB}' = F(E_c(\mathcal{Y}_{BA}), E_s(x_{BB})) = G(\mathcal{Y}_{BA}, x_{BB}, 0, 1),$ [Equation 10], In Equation 10, cycle swapped images $\{y'_{AA}, y'_{BB}\}$ may be a version of an image restored to an input image by the morphing generator G, which is, for example, swapped back to input images $\{x_{AA}, x_{BB}\}$ from a content or style of a swapped image $\{y_{AB}, y_{BA}\}$.

Figure 7:
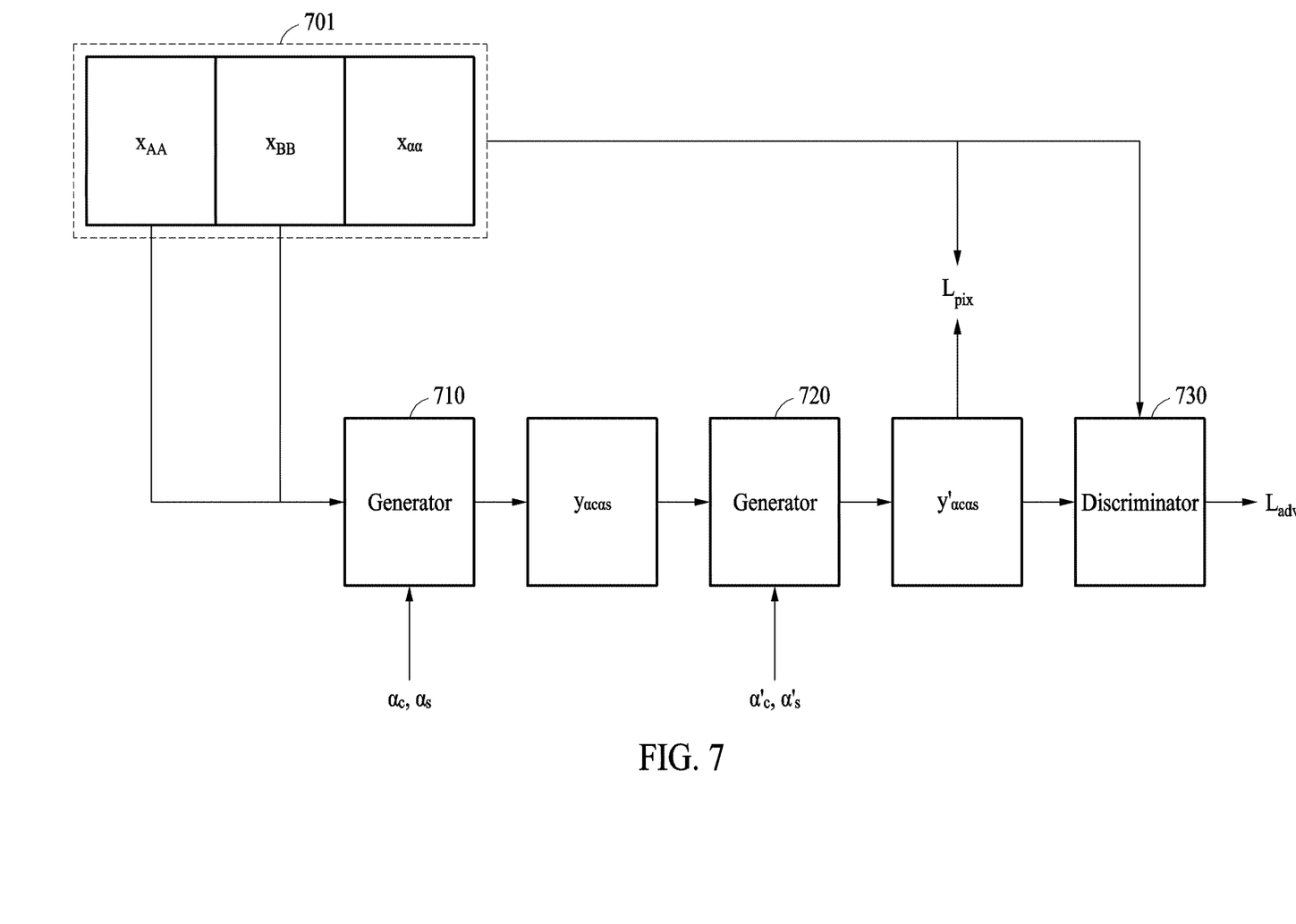

Referring to FIG. 7, a morphing image $y_{\alpha_c \alpha_s}$ output from a generator 710 based on morphing control parameters $\alpha_c$ and $\alpha_s$ may be input again to a morphing generator 720 along with parameters $\alpha'_c$ and $\alpha'_s$ for restoration to input images $\{x_{AA}, x_{BB}\}$, and an output image $y'_{\alpha_c \alpha_s}$ may thereby be generated for the restoration to the input images $\{x_{AA}, x_{BB}\}$.

Full Objective

A full objective function may be a combination of two main terms $L_{adv}$ and $L_{pix}$. The generator G may be trained by solving a minimum/maximum optimization problem as expressed in Equation 11.

$$G^* = \underset{G}{\operatorname{argmin}}\underset{D}{\max} \mathcal{L}_{adv} + \lambda \mathcal{L}_{pix}, \quad \text{[Equation 11]}$$

where $\mathcal{L}_{adv} = L_{adv}^{idt} + L_{adv}^{mrp} + L_{adv}^{swp} + L_{adv}^{cyc},$ $\mathcal{L}_{pix} = L_{pix}^{idt} + L_{pix}^{mrp} + L_{pix}^{cyc}.$ In Equation 11, a hyperparameter $\lambda$ may be used to maintain a balance between levels of importance of the terms of two main loss functions.

According to an example embodiment, an ID loss and a morphing loss may be used first for a basic transition, and a swapping loss and a cycle-swapping loss may then be added for a disentangled transition. During training, morphing control parameters $\alpha_c$ and $\alpha_s$ of the morphing generator G may be set as the same value (e.g., $\alpha_c = \alpha_s = 0$, $\alpha_c = \alpha_s = \alpha$ or $\alpha_c = \alpha_s = 1$) in Equations 7 and 8 for the basic transition, and be set differently in Equations 9 and 10 for the disentangled transition. In an inference phase after the training, a user may make a morphing image based on the basic transition by setting two parameters $\alpha_c$ and $\alpha_s$ as the same value between 0 and 1. The morphing generator G may independently set the values of a, and a, to individually morph a content and a style after learning a 2D content-style manifold.

Extensions and Applications

Multi Image Morphing

Figure 8:
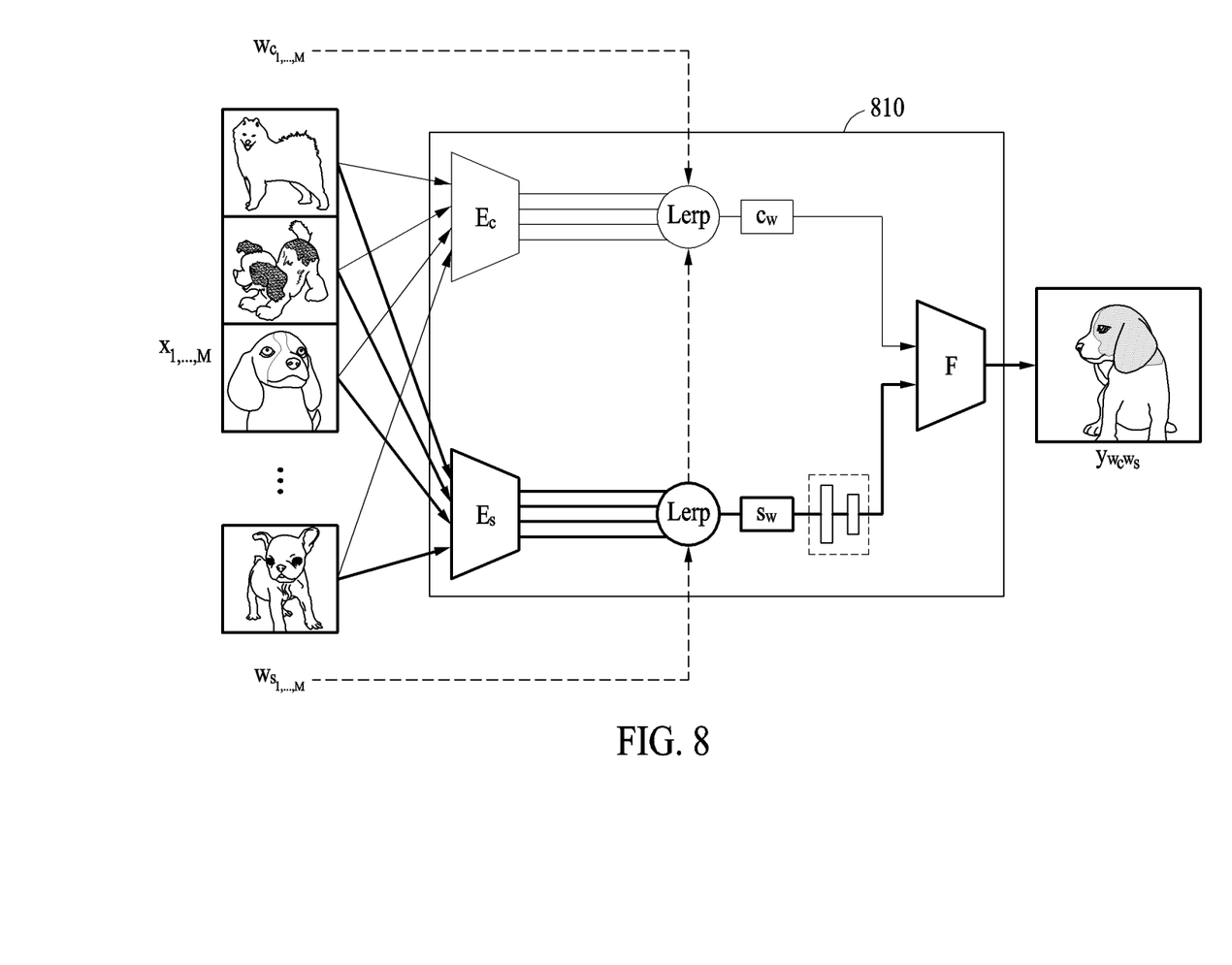
FIG. 8 is a diagram illustrating an operation of a morphing generator configured to process a plurality of input images according to an example embodiment.

FIG. 8 is a diagram illustrating an operation of a morphing generator configured to process a plurality of input images according to an example embodiment.

Although a morphing generator is described above as processing two input images, the operation of the morphing generator is not limited to processing only two images. Referring to FIG. 8, a morphing generator 810 may receive M images $x_1 \ldots x_M$ which are two or more. Morphing control parameters may include M weights respectively corresponding to the M images. According to an example embodiment, a morphing generator G that processes a plurality of input images may be generalized as expressed in Equation 12 by replacing parameters $\alpha_c$ and $\alpha_s$ used in Equation 3 with weights for the M images.

$$y_{w_c w_s} = G(x_{1,2,\ldots,M}, w_{c_{1,2,\ldots,M}}, w_{s_{1,2,\ldots,M}}), \quad \text{[Equation 12]}$$

$$= F(c_{w_s}, s_{w_s}),$$

-continued $$\text{where } c_{w_c} = \sum_{m=1}^{M} w_{c_m} E_c(x_m), \; s_{w_s} = \sum_{m=1}^{M} w_{s_m} E_s(x_m).$$

In Equation 12, $w_{c1,2,\ldots,M}$ denote content weights respectively corresponding to the M images, and $w_{s1,2,\ldots,M}$ denote style weights respectively corresponding to the M images. According to an example embodiment, constraint conditions $\Sigma_{m=1}^{M} w_{c_m} = 1$ and $\Sigma_{m=1}^{M} w_{s_m} = 1$ may be set for such content weights $w_{c1,2,\ldots,M}$ and style weights $w_{s1,2,\ldots,M}$. This adjustment may be applied only at runtime using the same network without any modification to a training procedure.

For example, the morphing generator 810 may obtain a content feature vector $c_w$ by calculating a weighted sum of content latent codes extracted from the M input images based on the content weights $w_{c1,2,\ldots,M}$ corresponding to the M images. Likewise, the morphing generator 810 may obtain a style feature vector $s_w$ by calculating a weighted sum of style latent codes extracted from the M input images based on the style weights $w_{s1,2,\ldots,M}$ corresponding to the M images.

Video Frame Interpolation

In a case in which frames are closely related and share a similar camera baseline, a frame interpolation may generate an intermediate image for two neighboring frames. According to an example embodiment, the morphing generator may process significantly different images, and thus generate a video with a high frame rate by assuming the frame interpolation as a sub-problem of image morphing. That is, the morphing generator may receive a plurality of frames included in a video, and output an intermediate frame(s) of the frames based on a morphing control parameter.

Figure 9:
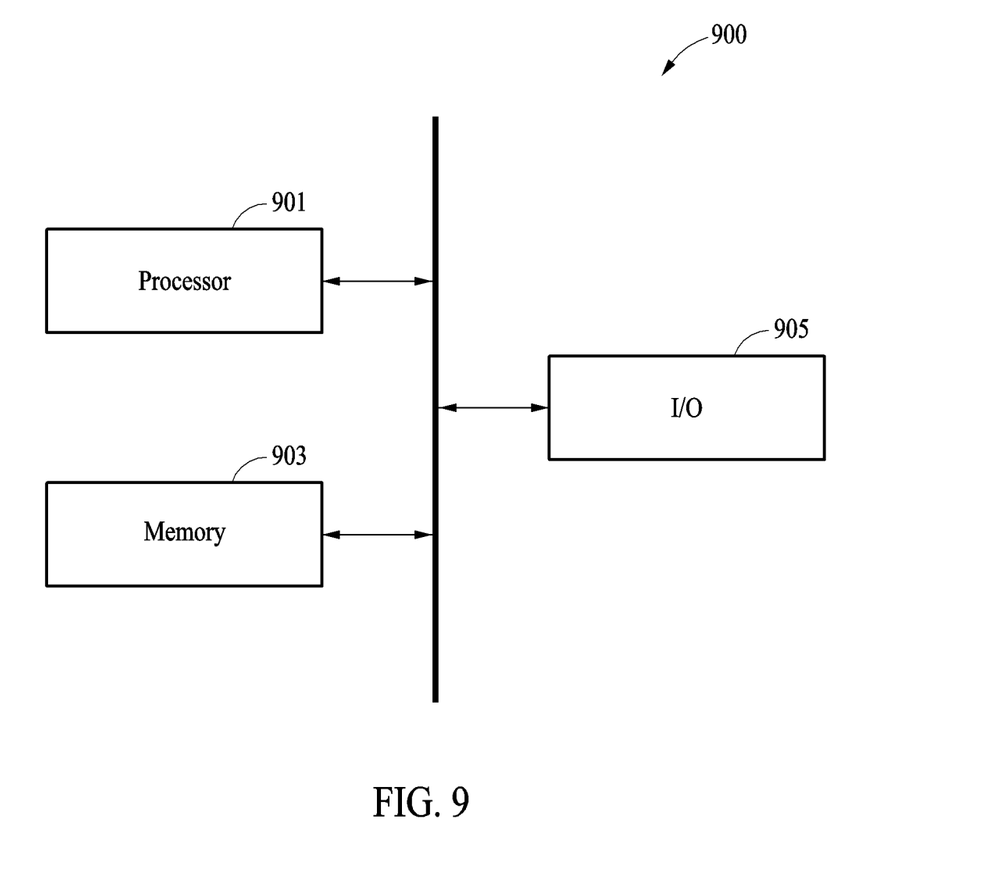
FIG. 9 is a diagram illustrating a configuration of an apparatus according to an example embodiment.

FIG. 9 is a diagram illustrating a configuration of an apparatus according to an example embodiment.

Referring to FIG. 9, an apparatus 900 may include a processor 901, a memory 903, and an input and output (I/O) device 905.

According to an example embodiment, the apparatus 900 may be a morphing generator described herein or an apparatus for performing an image processing method described herein, and include a server and a user device (e.g., a mobile phone, a computer, etc.). The processor 901 may perform an operation of the morphing generator or one or more, or all, of operations or methods described above with reference to FIGS. 1 through 8. The memory 903 may store information associated with the image processing method or a program by which the image processing method is implemented. The memory 903 may be a volatile or non-volatile memory.

The processor 901 may execute the program and control the apparatus 900. A code of the program executed by the processor 901 may be stored in the memory 903. The apparatus 900 may be connected to an external device (e.g., a personal computer (PC) or a network) through the 110 device 905 and exchange data therewith.

According to example embodiments described herein, it is possible to generate a natural morphing image regardless of a similarity between input images, and rapidly generate a morphing image by a deep learning-based morphing image generating method.

It is also possible to allow a user to separately control a degree of a content transition related to a composition of an image and a degree of a style transition related to an appearance of an image to obtain a morphing image between images, and thus provide rich usability.

The example embodiments may be applicable, in various ways, to morphing between two or more multiple images and video frame interpolation, for example.

The units described herein may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter.

The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A training method, comprising:
obtaining training data comprising a first image, a second image, and a ground truth morphing image that is based on a morphing control parameter, wherein the ground truth morphing image is generated by linearly interpolating a first point corresponding to the first image sampled in a latent space by a pretrained model and a second point corresponding to the second image sampled in the latent space by the pretrained model, based on the morphing control parameter;
obtaining an output morphing image by inputting the first image, the second image, and the morphing control parameter to a morphing generator; and
training the morphing generator based on a loss function that is based on at least one of the images comprised in the training data and the output morphing image,
wherein the loss function is determined based on at least one of:
an adversarial loss associated with a discrimination between the image comprised in the training data and the output morphing image obtained from the morphing generator; or
a pixel-wise reconstruction loss associated with a difference between pixels of the image comprised in the training data and pixels of the output morphing image.

2. The training method of claim 1, wherein the adversarial loss comprises a conditional adversarial loss in which class label information of one of the images comprised in the training data is set as a condition.

3. The training method of claim 1, wherein the adversarial loss is determined based on the morphing control parameter, an adversarial loss associated with a discrimination between the first image and the output morphing image, and an adversarial loss associated with a discrimination between the second image and the output morphing image, and
the pixel-wise reconstruction loss is determined based on the ground truth morphing image corresponding to the morphing control parameter among the images comprised in the training data and on the output morphing image.

4. The training method of claim 1, wherein the morphing control parameter comprises a content morphing control parameter and a style morphing control parameter,
wherein the obtaining of the output morphing image comprises:
obtaining a first output morphing image comprising a content of the second image and a style of the first image; and
obtaining a second output morphing image comprising a content of the first image and a style of the second image,
wherein the training of the morphing generator comprises:
training the morphing generator based on an adversarial loss associated with a discrimination between the first output morphing image and the first image, and an adversarial loss associated with a discrimination between the second output morphing image and the second image.

5. The training method of claim 4, wherein the training of the morphing generator comprises:
obtaining a third morphing image comprising a content of the first output morphing image and the style of the second image by inputting the first output morphing image and the second image to the morphing generator;
obtaining a fourth morphing image comprising a content of the second output morphing image and the style of the first image by inputting the second output morphing image and the first image to the morphing generator;
training the morphing generator based on an adversarial loss and a pixel-wise reconstruction loss that are based on the third output morphing image and the second image; and
training the morphing generator based on an adversarial loss and a pixel-wise reconstruction loss that are based on the fourth output morphing image and the first image.

6. A non-transitory computer-readable storage medium storing instructions that, when executed by a processor, cause the processor to perform the image processing method of claim 1.

7. An image processing apparatus, comprising:
at least one processor;
wherein, the processor is configured to:
obtain training data comprising a first image, a second image, and a ground truth morphing image that is based on a morphing control parameter, wherein the ground truth morphing image is generated by linearly interpolating a first point corresponding to the first image sampled in a latent space by a pretrained model and a second point corresponding to the second image sampled in the latent space by the pretrained model, based on the morphing control parameter;
obtain an output morphing image by inputting the first image, the second image, and the morphing control parameter to a morphing generator; and
train the morphing generator based on a loss function that is based on at least one of the images comprised in the training data and the output morphing image,
wherein the loss function is determined based on at least one of:
an adversarial loss associated with a discrimination between the image comprised in the training data and the output morphing image obtained from the morphing generator; or
a pixel-wise reconstruction loss associated with a difference between pixels of the image comprised in the training data and pixels of the output morphing image.

8. The image processing apparatus of claim 7, wherein the adversarial loss comprises a conditional adversarial loss in which class label information of one of the images comprised in the training data is set as a condition.

9. The image processing apparatus of claim 7, wherein the adversarial loss is determined based on the morphing control parameter, an adversarial loss associated with a discrimination between the first image and the output morphing image, and an adversarial loss associated with a discrimination between the second image and the output morphing image, and the pixel-wise reconstruction loss is determined based on the ground truth morphing image corresponding to the morphing control parameter among the images comprised in the training data and on the output morphing image.

10. The image processing apparatus of claim 7, wherein the morphing control parameter comprises a content morphing control parameter and a style morphing control parameter, for the obtaining of the output morphing image, wherein the processor is configured to:

obtain a first output morphing image comprising a content of the second image and a style of the first image; and obtain a second output morphing image comprising a content of the first image and a style of the second image, wherein the training of the morphing generator comprises:

training the morphing generator based on an adversarial loss associated with a discrimination between the first output morphing image and the first image, and an adversarial loss associated with a discrimination between the second output morphing image and the second image.

11. The image processing apparatus of claim 10, for the training of the morphing generator, wherein the processor is configured to:

obtain a third morphing image comprising a content of the first output morphing image and the style of the second image by inputting the first output morphing image and the second image to the morphing generator;

obtain a fourth morphing image comprising a content of the second output morphing image and the style of the first image by inputting the second output morphing image and the first image to the morphing generator;

train the morphing generator based on an adversarial loss and a pixel-wise reconstruction loss that are based on the third output morphing image and the second image; and train the morphing generator based on an adversarial loss and a pixel-wise reconstruction loss that are based on the fourth output morphing image and the first image.

\* \* \* \* \*